Figure 1:
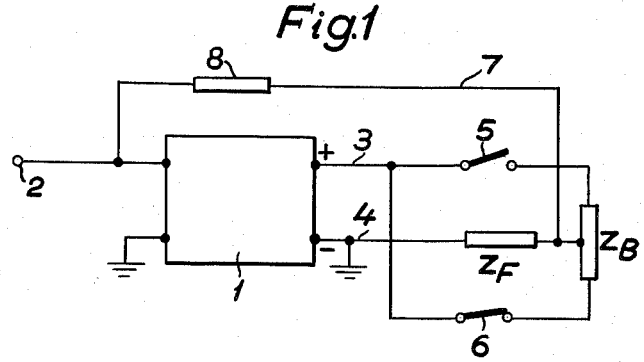

July 6, 1965   O. UGLUM ETAL   3,193,773
MODULATOR-DEMODULATOR CIRCUIT
Filed Nov. 14, 1961   2 Sheets-Sheet 1

INVENTOR.
Oddgeir Uglum
Harry Flaten
BY
Bailey, Stephens & Huettig
ATTORNEYS

July 6, 1965

O. UGLUM ETAL 3,193,773

MODULATOR-DEMODULATOR CIRCUIT

Filed Nov. 14, 1961

2 Sheets-Sheet 2

INVENTOR.
Oddgeir Uglum
Harry Flaten
BY
Bailey, Stephens & Huettig
ATTORNEYS

United States Patent Office

3,193,773
Patented July 6, 1965

3,193,773
MODULATOR-DEMODULATOR CIRCUIT
Oddgeir Uglum and Harry Flåten, Vasteras, Sweden, assignors to Allmanna Svenska Elektriska Aktiebolaget, Vasteras, Sweden, a Swedish corporation
Filed Nov. 14, 1961, Ser. No. 152,276
Claims priority, application Sweden, Nov. 15, 1960, 10,957/60
7 Claims. (Cl. 330—10)

The present invention relates to a modulator-demodulator circuit. The terms modulator and demodulator are used here with the accepted meaning within the control and measuring technique. By modulator is thus generally meant a device for converting a direct current quantity to an alternating current quantity of a certain desired frequency and with an amplitude which is proportional to the value of the direct current quantity. In a corresponding way, by demodulator is meant a device which converts an alternating current quantity to a direct current quantity, the value of which is proportional to the amplitude of the alternating current quantity. Demodulators are also often called phase-sensitive rectifiers. The modulating and demodulating respectively, is usually obtained with the help of current-connecting elements, for example biased rectifier-valves, transistors, or mechanical contacts or combinations thereof, which are worked at a certain pre-determined frequency. Most known circuits can in principle, and usually also in practice, be used for both modulating and demodulating. Which function is obtained is mainly dependent upon whether the input quantity to the circuit is an alternating current quantity or a direct current quantity. The following thus applies both to modulator and demodulator circuits unless otherwise stated.

With modulator and demodulator circuits, particularly for measuring and calculating purposes, it is often desirable that the output quantity from the circuit is with great accuracy proportional to the input quantity. As is known, the accuracy of an arbitrary electrical circuit can be considerably improved by returning part of the output quantity to the input circuit. However, with modulator and demodulator circuits this involves certain difficulties since the output quantity of the circuit does not have the same curve shape as the input quantity and therefore cannot be returned to the input. With known modulator and demodulator devices a solution to this problem has been sought by giving feed-back only to the amplifier which normally precedes the modulator or demodulator itself. In this way the accuracy of the pre-amplifier is substantially improved, but possible faults depending on the modulator or demodulator circuit itself cannot be eliminated in this way. Another method is to convert the output quantity of the modulator or demodulator circuit by means of rectifying or by breaking down respectively so that it receives the same curve shape as the input quantity of the circuit, and thereupon return it to the input. In this way, substantially all faults are eliminated which are introduced in the pre-amplifier of the device as well as in the modulator or demodulator circuit itself. The feed-back circuit, however, will contain a device for altering the curve shape of the feed-back quantity, and the faults which this device is impaired with will be found again in the feed-back quantity and will thus also influence the accuracy of the whole modulator and demodulator circuit.

The object of the present invention is to effect a modulator-demodulator circuit in which the output quantity is with great accuracy proportional to the input quantity. The invention is characterised substantially in that the modulator-demodulator circuit is so constructed that a quantity may be taken from it, the value of which is with great accuracy proportional to the output quantity of the modulator-demodulator circuit, but which has the same curve shape as the input quantity of the circuit, and that the first mentioned quantity is fed back to the input of the modulator-demodulator circuit.

Figure 2:
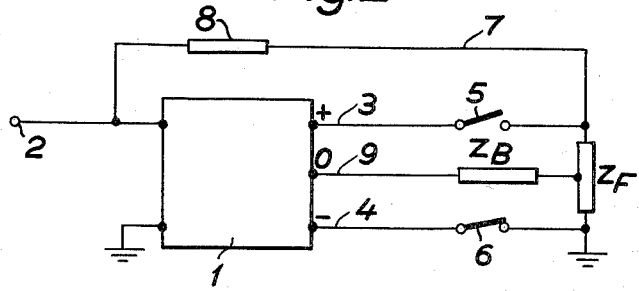

In the following the invention will be more closely described with reference to the accompanying drawing, in which FIGURES 1 and 2 show the invention applied to two different types of modulator-demodulator circuits, while FIGURES 3–6 show in more detail four different embodiments of the invention.

The modulator-demodulator circuit shown in FIGURE 1 consists partly of a unit 1, which in this case is of less interest but which may contain members for possibly required amplification of the input quantity connected to the input terminal 2 and for possibly required phase shifting of this. It is essential only that between the connections 3 and 4 and the unit 1 a voltage is obtained which is directly proportional to the input quantity connected to the terminal 2 and which has exactly the same curve shape as this. Part 1 constitutes an input stage having input terminals at 2 and to ground. The actual modulator-demodulator part consists essentially of an output stage composed of two current connecting elements or means 5 and 6 which are shown here as mechanical contacts. As already mentioned, the current connecting elements need not consist of mechanical contacts but can also consist of other components for example biased rectifier valves, transistors or the like, or combinations of such. It is, however, important that these current connecting elements are controlled in such a way that they operate periodically with the same frequency but in a push-pull manner, so that one element is conducting while the other blocks. One current connecting element 5 is connected between the output terminals 3 and 4 of the input stage (each constituting an output terminal means) in series with one half of the load impedance $Z_B$ and another impedance $Z_F$. The other current connecting element 6 is in a corresponding way connected between the connecting terminals 3 and 4 in series with the other half of the load impedance $Z_B$ and the impedance $Z_F$. The polarity signs on the connection terminals 3 and 4 do not mean that the voltage between them must necessarily be a direct voltage. This is only the case when the device is used as modulator. If the device is used as a demodulator an alternating voltage prevails between the connecting terminals 3 and 4, which means that the polarity of both connection terminals varies periodically, but always, however, so that the connection terminals 3 and 4 have opposite polarity. If the device is to be used as demodulator, thus, an alternating voltage prevails between the connection terminals 3 and 4, the current connecting elements 5 and 6 at the same time being controlled with the same frequency as this alternating voltage. This means, for example, that when the connection terminal 3 is positive the contact 5 is closed and a current therefore flows from the terminal 3 via the contact 5 over half the load resistance $Z_B$ through the impedance $Z_F$ to the other terminal 4. At the same time as the voltage on the terminals 3 and 4 alters sign the contact 5 opens and the contact 6 closes. Consequently a current will then flow from the terminal 4 through impedance $Z_F$, the lower half of the load impedance $Z_B$, the closed contact 6 and to the terminal 3. A direct current thus arises through the load impedance $Z_B$, the magnitude of which is directly proportional to the alternating voltage prevailing between the terminals 3 and 4, i.e. to the alternating current quantity connected to the input 2. As is clear from the above, the current flowing through the load impedance $Z_B$ also flows at each moment through the impedance $Z_F$. However, the current through the impedance $Z_F$ alters direction in accordance with the frequency of the alternating voltage. The voltage over the impedance $Z_F$ will therefore with great accuracy be proportional as far as the amplitude is concerned to the output quantity of the circuit, i.e., the current through the load impedance $Z_B$. The curve shape for the voltage over the impedance $Z_F$, however, will exactly correspond to the curve shape of the input alternating current quantity connected to the input 2. The voltage over the impedance $Z_F$, which in the following will be called the feed-back impedance, may thus without interference be fed back by means of a feed-back connection 7 to the input 2 of the modulator-demodulator device. The feed-back connection 7 contains an impedance 8 by means of which the feed-back factor can be set. The accuracy of the modulator-demodulator according to the invention will be very great since the feed-back branch embraces the whole modulator-demodulator device.

The modulator-demodulator device shown in FIGURE 2 consists, as does that shown in FIGURE 1, of a unit 1 to the terminals 2 of which an input quantity is connected. The unit 1, however, is arranged so that besides the terminals 3' and 4' which here constitute one output terminal means, it has a zero terminal 9 constituting another output terminal means which corresponds to a mid-point of the input quantity. Neither in this case do the polarity signs on the terminals 3 and 4 mean that a direct voltage must necessarily prevail between them, but only that these terminals at each moment have opposite polarity while the terminal 9 has a potential exactly between the potential of the terminals 3 and 4. The actual modulator-demodulator unit consists also in this case of two current connecting elements or means 5 and 6 which are controlled so that they operate periodically with the same frequency but in push-pull. One current connecting element 5 is in this case connected between the terminal 3 and the terminal 9 in series with one half of the feed-back impedance $Z_F$ and the load impedance $Z_B$. The other current connecting element 6 is in a corresponding way connected between the terminals 4 and 9 in series with the other half of the feed-back impedance $Z_F$ and the load impedance $Z_B$. If the device is used as demodulator an alternating voltage, as mentioned above, prevails between the terminals 3 and 4. It can be supposed that when the terminal 3 is positive the contact 5 is closed while the contact 6 is open. Thus a current flows from the terminal 3 via the contact 5 over half the feed-back impedance $Z_F$ and the load $Z_B$ to the terminal 9. When the polarity of the terminals 3 and 4 alters, the position of the contacts 5 and 6 also alters so that a current flows from the terminal 4 through the contact 6, the lower half of the feed-back impedance $Z_F$, and the load $Z_B$ to the terminal 9. Consequently, a direct current flows through the load impedance $Z_B$, the value of which is proportional to the amplitude of the alternating voltage between the terminals 3 and 4, i.e. to the input alternating current quantity connected to the input terminal 2. At each moment the same current which flows through the load impedance $Z_B$ also flows through one half of the feed-back impedance $Z_F$ while the current in the other half is zero. The voltage over the feed-back impedance $Z_F$ is thus with very great accuracy proportional to the current flowing through the load. The current through the feed-back impedance, however, alters direction in accordance with the frequency of the input alternating current quantity so that the voltage of the feed-back impedance maintains exactly the same curve shape as the input quantity. The voltage over the feed-back impedance $Z_F$ is, as in FIGURE 1, fed back via a feed-back connection 7 containing an impedance 8 for determining the feed-back factor.

The embodiments of the invention shown in FIGURES 1 and 2 applied to two different types of modulator-demodulator circuits have been described under the assumption that they are to be used as demodulators. Both the circuits, however, could in principle also be used as modulators, whereby the input quantity is a direct current quantity and a direct voltage consequently prevails between the terminals 3 and 4. The method of operation should without difficulty be understandable with reference to the two figures.

Figure 3:
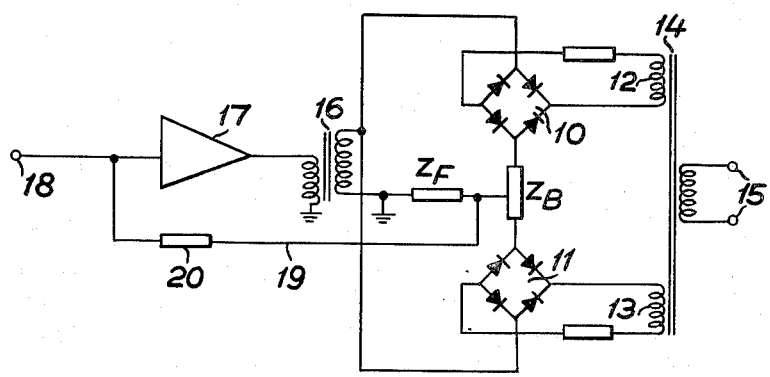

FIGURE 3 shows more in detail a particular embodiment of a demodulator circuit according to the invention. The circuit consists essentially of two Graetz-connections 10 and 11 built up of rectifier valves. These are connected with their direct voltage diagonal points to two secondary windings 12, 13 on a transformer 14, the primary of which at 15 is connected to a control alternating voltage. The two Graetz-bridges 10 and 11 are in series with each other and with the load impedance $Z_B$, which is connected between the bridges, connected to one pole of the secondary winding of an input transformer 16, such pole constituting an output terminal means. The feed-back impedance $Z_F$ is connected between the mid-point of the load $Z_B$ and the other end of the secondary winding of the input transformer 16 constituting the other output terminal means. The input transformer 16 is fed on the primary side from an amplifier 17, to the input 18 of which is connected the input quantity for the demodulator circuit. The voltage over the feed-back impedance $Z_F$ is fed back via a connection 19 to the input 18 of the device. The feed-back connection 19 contains a resistor 20 with the help of which the feed-back can be determined. The control alternating voltage connected to the primary of the transformer 14 has the same frequency as the input alternating current quantity. An alternating voltage thus prevails over the secondary winding of the transformer 16, the amplitude of which is directly proportional to the input alternating current quantity. The two Graetz-bridges 10 and 11 constitute controlled current connecting means. They are kept alternately conducting and blocked in opposition to each other with the help of the alternating voltages from the secondary windings 12 and 13 of the transformer 14. The method of operation of the device is as follows. When the upper end of the secondary winding of the input transformer 16 is positive, the Graetz-bridge 10 is simultaneously kept conducting by the alternating voltage from the secondary winding 12. Consequently current flows from the secondary winding of the transformer 16 through the Graetz-bridge 10, the upper half of the load $Z_B$ and the feed-back impedance $Z_F$. At the same time as the polarity of the voltage over the secondary winding of the transformer 16 alters so that its lower end becomes positive, the Graetz-bridge 10 is blocked while the Graetz-bridge 11 becomes conducting due to the alternating voltage from the secondary winding 13. A current consequently flows from the secondary winding on the transformer 16 through the feed-back impedance $Z_F$, the lower part of the load $Z_B$ and the Graetz-bridge 11. It is obvious that this connection may also be used without drawbacks as modulator, whereby the input transformer 16 is no longer required and the amplifier 17 must be a direct current amplifier.

Figure 4:
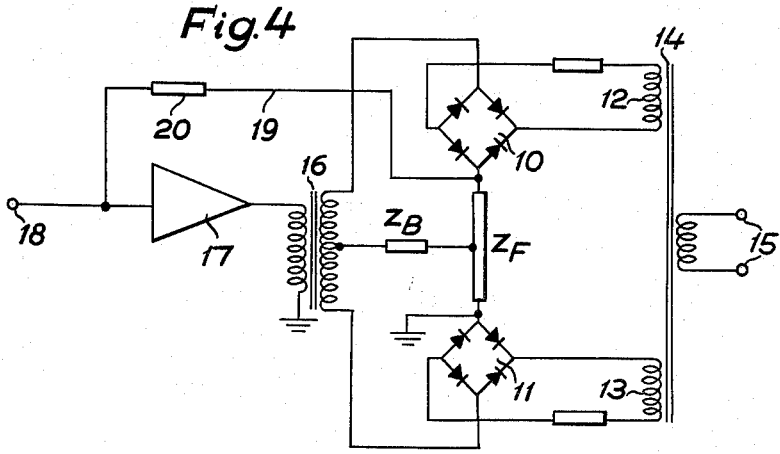

The demodulator circuit shown in FIGURE 4 differs from those shown in FIGURES 1–3 only in that the two Graetz-bridges 10 and 11 are series-connected to the feed-back impedance $Z_F$ and connected to opposite ends of the secondary winding of the input transformer 16. Further, the load impedance $Z_B$ is connected between the mid-point of the feed-back impedance $Z_F$ and a centre tap on the secondary winding of the input transformer 16. The method of operation of the circuit should easily be understood with the aid of the circuit diagram and the description given for FIGURE 2. This circuit may also without difficulty be used as modulator circuit.

Figure 5:
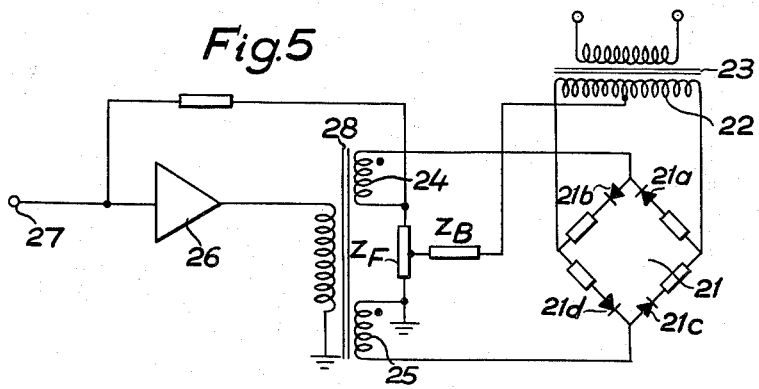

The demodulator-circuit shown in FIGURE 5 consists essentially according to the invention of a so-called ring-modulator 21 built up of rectifier valves. The ring-modulator 21 is connected by one pair of diagonal points to the secondary winding 22 on the transformer 23 which is fed at the primary from a control alternating voltage. The ring-modulator-bridge 21 is by its other pair of diagonal points connected to two secondary windings 24, 25 on an input transformer 28, which is on the primary fed from an amplifier 26, to the input 27 of which the input quantity of the device is connected. Between the two other ends of the secondary windings 24, 25 a feed-back impedance $Z_F$ is connected. The load $Z_B$ is connected between the centre-tap on the secondary widing 22 and the centre-tap on the feed-back impedance $Z_F$. The voltage over the feed-back impedance $Z_F$ is conventionally connected to the input 27 of the device. The method of operation of the device is as follows. When the alternating voltage over the secondary windings 24 and 25 has such a polarity that the upper ends of the secondary windings are positive, the right hand end of the secondary winding 22 on the control transformer 23 is supposed to be positive. A current thus flows from the secondary winding 22 through the two upper valves 21a and 21b in the ring-modulator-bridge 21. Both these valves are thus kept conducting. The two lower valves 21c and 21d, however, are kept blocked by the voltage from the secondary winding 22. A current consequently flows from the secondary winding 24 on the transformer 28 through the two valves 21a and 21b in the ring-modulator-bridge 21, the secondary winding 22, the load impedance $Z_B$ and the upper part of the feed-back impedance $Z_F$. When the alternating voltages over the secondary windings 24 and 25 on the input transformer change polarity, the voltage over the secondary winding 22 on the control transformer 23 also changes polarity. The voltage from the secondary winding 22 thus blocks the valves 21a and 21b and the valves 21c and 21d instead remain conducting. A current consequently flows in this case from the secondary winding 25 through the valves 21c and 21d in the ring-modulator bridge 21, the secondary winding 22, the load $Z_B$ and the lower half of the feed-back impedance $Z_F$.

Figure 6:
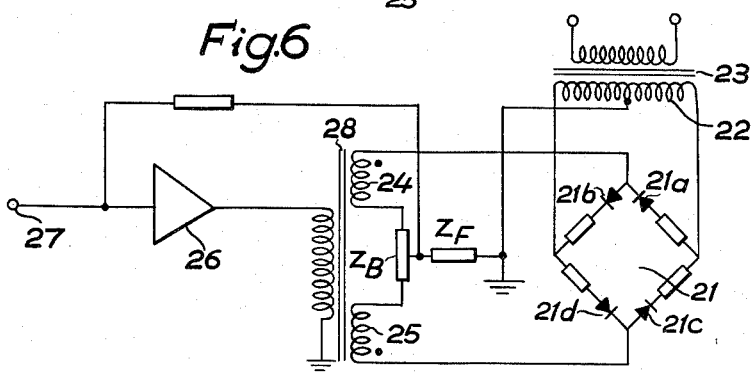

The demadulator circuit shown in FIGURE 6 consists, as does that shown in FIGURE 5, essentially of a so-called ring-modulator-bridge 21 and differs from the circuit shown in FIGURE 5 substantially only in that the two secondary windings 24 and 25 of the input transformer 28 are connected to the ring-modulator-bridge 21 with the ends having like poles. Further, the other ends of the secondary windings 24 and 25 are connected together via the load $Z_B$ while the feed-back impedance $Z_F$ is connected between the mid-point of the load $Z_B$ and the centre-tap of the secondary winding 22. The method of operation of the circuit should easily be understood merely with the aid of the circuit diagram and the above description for FIGURE 5.

We claim:

1. Modulator-demodulator circuit with an input stage and an output stage, a load means connected in the output stage, a feed back impedance means in the output stage, one of said means having two end terminals and a center tap, the input stage having input terminals for receiving an input quantity and first and second output terminals means, said output stage containing two controlled current connecting means operating periodically at the same frequency but in a push-pull manner, one of said current connecting means being connected between one of said end terminals and one of the output terminal means of the input stage, the other current connecting means being connected between the other end terminal and the same output terminal means of the input stage, the other of said load and feedback impedance means being connected between said center tap and the other output terminal means of the input stage, and means to supply the voltage generated across said feedback impedance to one of the input terminals of said input stage, whereby a feedback signal conforming to the input quantity is obtained and supplied to the input side of said modulator-demodulator circuit.

2. Modulator-demodulator circuit with an input stage and an output stage, a load means connected in the output stage and having two end terminals and a center tap, a feedback impedance in the output stage, the input stage having input terminals for receiving an input quantity and two output terminals, said output stage containing two controlled current connecting elements operating periodically at the same frequency but in a push-pull manner, one of said current connecting elements being connected between one end terminal of said load means and one of the output terminals of the input stage, the other current connecting element being connected between the other end terminal of the load means and the same output terminal of the input stage, said feedback impedance being connected between the center tap of said load means and the other output terminal of said input stage, and means to supply the voltage generated across said feedback impedance to one of the input terminals of said input stage, whereby a feedback signal conforming to the input quantity is obtained and supplied to the input side of said modulator-demodulator circuit.

3. Modulator-demodulator circuit with an input stage and an output stage, a load means connected in the output stage, a feedback impedance in the output stage having two end terminals and a center tap, the input stage having input terminals for receiving an input quantity and three output terminals, one of said output terminals constituting a center terminal having a potential which is the average of the potentials of the other two terminals constituting end terminals, said output stage containing two controlled current connecting elements operating periodically at the same frequency but in a push-pull manner, one of said current connecting elements being connected between one terminal of the feedback impedance and one of the end output terminals of the input stage, the other current connecting element being connected between the other terminal of the feedback impedance and the other end output terminal of the input stage, said load means being connected between the center tap of the feedback impedance and the center output terminal of the input stage, and means to supply the voltage generated across said feedback impedance to one of the input terminals of said input stage, whereby a feedback signal conforming to said input quantity is obtained and supplied to the input side of the modulator-demodulator circuit.

4. Modulator-demodulator circuit with an input stage and an output stage, a feedback impedance in the output stage, a load means connected in the output stage, said load means having two end terminals and a center tap, the input stage having input terminals for receiving an input quantity and two output terminals, said output stage containing two single-phase full-wave rectifier bridges, a transformer having two secondary windings and at least one primary winding, means for supplying a primary winding of said transformer with a control alternating voltage, means connecting the direct voltage diagonal points of one of said bridges to one of said secondary windings, means connecting the direct voltage diagonal points of the other of said bridges to the other of said secondary windings, one alternating current diagonal point of one bridge being connected to an end terminal of the load means, the other end terminal of the load means being connected to a corresponding point of the other bridge, the other alternating current diagonal points of said bridges being connected to each other and to one output terminal of the input stage, the feedback impedance being connected between the other output terminal of the input stage and the center tap of the load means, and means to supply the voltage generated across said feedback impedance to said input circuit, whereby a feedback signal conforming to said input quantity is obtained and supplied to the input side of said modulator-demodulator circuit.

5. Modulator-demodulator circuit with an input stage and an output stage, a load means connected to the output stage, a feedback impedance in the output stage having two end terminals and a center tap, the input stage having input terminals for receiving an input quantity and three output terminals one of said output terminals constituting a center terminal and having a potential which is the average of the potentials of the other two terminals constituting the end terminals, said output stage containing two single phase full wave rectifier bridges, a transformer having two secondary windings and at least one primary winding, means for supplying a primary winding of said transformer with a control alternating voltage, means connecting the direct voltage diagonal points of one of said bridges to one of said secondary windings, means connecting the direct voltage diagonal points of the other bridge to the other secondary winding, one alternating current diagonal point of one bridge being connected to an end terminal of said feedback impedance, the other end terminal of said feedback impedance being connected to a corresponding point of the other bridge, the other alternating current diagonal points of said bridges being connected one to each of the end output terminals of the input stage, said load means being connected between the center output terminal of the input circuit and the center tap of the feedback impedance, and means to supply the voltage generated across said feedback impedance to one of the input terminals of said input stage, whereby a feedback signal conforming to said input quantity is generated and supplied to the input side of said modulator-demodulator circuit.

6. Modulator-demodulator circuit with an input stage and an output stage, a load means connected to the output stage, a feedback impedance in the output stage having two end terminals and a center tap, said input stage having input terminals for receiving an input quantity and containing a first transformer with two secondary windings connected to the output stage, said output stage comprising a ring-modulator bridge containing rectifier valves, said output stage further comprising a second transformer having a secondary winding with a center tap and at least one primary winding, means connecting said secondary winding of said second transformer to two diagonal points of said bridge, a control alternating voltage being connected to a primary winding of said second transformer, one of the other two diagonal points of said bridge being connected to a terminal of one of the other secondary windings of said first transformer, the other terminals of said secondary windings each being connected to an end terminal of the feedback impedance, said load means being connected between the center tap of the feedback impedance and said center tap of the secondary winding of said second transformer, and means to supply the voltage generated across said feedback impedance to one of the input terminals of said input stage, whereby a feedback signal conforming to said input quantity is obtained and supplied to the input side of said modulator-demodulator circuit.

7. Modulator-demodulator circuit with an input stage, an output stage and a load means connected in the output stage, said load means having two end terminals and a center tap, said input circuit having input terminals for receiving an input quantity and comprising a first transformer with two secondary windings, said secondary windings being connected to the output stage, said output stage comprising a second transformer, the secondary winding of said second transformer having a center tap, the primary winding of said second transformer being connected to a control alternating voltage, said output stage also comprising a feedback impedance and a ring-modulator bridge containing rectifier valves, the end terminals of the secondary windings of said second transformer being connected to two diagonal points of said bridge, one of the two other diagonal points of said bridge being connected to a terminal of one of the secondary windings of said first transformer, the other of said last mentioned diagonal points of said bridge being connected to a terminal of the other of said secondary windings, the other two terminals of said secondary windings being connected one to each end terminal of the load means, said feedback impedance being connected between the center tap of said load means and the center tap of the secondary winding of said second transformer, and means to supply the voltage generated across said feedback impedance to one of the input terminals of said input stage, whereby a feedback signal conforming to said input quantity is obtained and supplied to the input side of said modulator-demodulator circuit.

References Cited by the Examiner

UNITED STATES PATENTS

| | | | |
|---|---|---|---|
| 2,489,248 | 11/49 | Abraham | 329—166 X |
| 2,575,904 | 11/51 | Bischoff | 330—10 X |
| 3,036,273 | 5/62 | Holbrook et al. | 329—166 X |
| 3,058,068 | 10/62 | Hinrichs et al. | 330—10 |
| 3,130,373 | 4/64 | Braymer | 330—10 X |

ROY LAKE, *Primary Examiner.*

NATHAN KAUFMAN, *Examiner.*